(12) United States Patent
Zhuyan

(10) Patent No.: US 7,539,917 B2
(45) Date of Patent: May 26, 2009

(54) ACKNOWLEDGEMENT SIGNALING FOR AUTOMATIC REPEAT REQUEST MECHANISMS IN WIRELESS NETWORKS

(75) Inventor: Zhao Zhuyan, Beijing (CN)

(73) Assignee: Nokia Corporation, Espoo (FI)

( * ) Notice: Subject to any disclaimer, the term of this patent is extended or adjusted under 35 U.S.C. 154(b) by 459 days.

(21) Appl. No.: 10/598,564

(22) PCT Filed: Jun. 2, 2004

(86) PCT No.: PCT/IB2004/001800

§ 371 (c)(1),
(2), (4) Date: Sep. 5, 2006

(87) PCT Pub. No.: WO2005/119959

PCT Pub. Date: Dec. 15, 2005

(65) Prior Publication Data

US 2007/0150788 A1    Jun. 28, 2007

(51) Int. Cl.
*H04L 1/18* (2006.01)

(52) U.S. Cl. .................................... 714/749
(58) Field of Classification Search .......... 714/748–751
See application file for complete search history.

(56) References Cited

U.S. PATENT DOCUMENTS 5,003,534 A    3/1991 Gerhardt et al.

2004/0123209 A1*  6/2004 Ishida ......................... 714/748

FOREIGN PATENT DOCUMENTS

EP          1286491 A1    2/2003
WO       WO 00/10298       2/2000

* cited by examiner

*Primary Examiner*—Guy J Lamarre
(74) *Attorney, Agent, or Firm*—Alston & Bird LLP

(57) ABSTRACT

The present invention purposes an enhanced acknowledgment/non-acknowledgment signaling applicable to automatic repeat request mechanisms. The automatic repeat request (ARQ) mechanisms is operable with a sender of data packets. The signaling comprises a number of ACK/NACK messages, which are dedicated to be transmitted on a time-multiplexed channel, which is partitioned into transport time intervals (TTIs) in accordance with the time multiplexing. Within each transport time interval (TTI), a number of pre-defined shares is defined. Each share has a predefined extent in time. Each ACK/NACK message is transmitted within a predefined selection of shares. The total extent in time of the predefined selection of shares corresponds to an extent in time of the transport time interval. The inventive method enables to extend the interleave length for the transmission of a ACK/NACK messages without requiring only radio frequency resources, required with known signaling methods.

18 Claims, 5 Drawing Sheets

ACKNOWLEDGEMENT SIGNALING FOR AUTOMATIC REPEAT REQUEST MECHANISMS IN WIRELESS NETWORKS

The present invention relates to the field of automatic repeat request (ARQ) mechanisms. In particular the present invention relates to an improvement in acknowledgment/non-acknowledgment signaling for controlling ARQ mechanisms, especially applicable to frequency duplex division (FDD) transmission mechanisms.

The widespread use of Internet Protocol (IP) based services and in particular Transmission Control Protocol (TCP) based services is characteristic for data communication within today's Internet. Efforts are under development to migrate services available over the Internet to wireless networks and especially to the third generation wireless networks being currently introduced in the mass market. Network operators and service providers operating in the field of third generation wireless networks hope for benefiting from the high data rate packet services operable with the third generation wireless networks in that services available up to now merely wire-based might be migrated to wireless networks presenting itself new economic opportunities. Typical applications which benefit from high data rates, include video-clips, multimedia, e-mail, telematics, gaming, video-streaming etc.

Whereas High Speed Downlink Packet Access (HS-DPA) has been developed and standardized in the context of the Third Generation Partnership Project (3GPP) and in particular in the UTRA (UMTS terrestrial radio access) FDD (frequency duplex division) domain, the development of a corresponding uplink packet access with enhanced data rate is still demanded.

One main aspect of the Transmission Control Protocol (TCP), which represents the dominant transmission protocol in today's wire-based networks is its well-designed flow and congestion control mechanism, which were introduced under the assumption that packet losses are due to network congestion only. However, wireless networks such as UMTS (universal mobile telecommunications system) are not reliable, i.e. the wireless networks are characterized by high bit and block error rates resulting in packet losses. To overcome the disadvantages of packet losses, which are not acceptable in conjunction with a huge number of applications, low layer protocols employed for instance by the UMTS make use of error recovering mechanisms. One major class of error recovery mechanisms is formed by the automatic repeat request (ARQ) mechanisms. Unfortunately, these error recovery mechanisms and specially ARQ mechanisms result in variable time delays from point of the transmission protocol resulting from re-transmission for recovering erroneous data.

In view of enhanced uplink packet access (EUPA) H-ARQ (hybrid automatic repeat request) represents an eventually designated error recovery mechanisms applicable therewith.

When H-ARQ mechanisms are used for data uplink, a mobile terminal (UE) sends physical layer frames comprising uplink data packets to a base station (NodeB) and the radio network controller (RNC), which from the radio network sub-system (RNS). The base station represents the radio frequency access point of the network. The base station receives, demodulates and decodes each frame to recover the data packets transmitted in the physical layer frame. In case the recovery is successful, the base station transmits back a acknowledgment signaling massage (ACK) to the mobile terminal at a downlink channel to inform the mobile terminal that the corresponding frame has been received correctly. Otherwise, i.e. the recovery by the base station fails, the base station transmits back a non-acknowledgment signaling massage (NACK) to the mobile terminal to inform the mobile terminal that the corresponding frame has been received corrupted. In consequence to non-acknowledgment signaling massage (NACK), the mobile terminal is instructed to send a new frame to base station, which new frame comprises data enabling the recovery of the data included in the original frame, which has been received corrupted. The data content of the new frame depends on the type of ARQ mechanism employed. The H-ARQ mechanism as illustrated above allows the base station to quickly recover erroneous data within a time delay of for instance 30-40 ms, which is benefit or at least sufficient for delay sensitive packet services.

Nevertheless ACK/NACK singling quality is very important for the H-ARQ performance and consequently the data throughput performance. In case the ACK/NACK signaling to the mobile terminal is erroneous, the H-ARQ performance and the data throughput performance suffer significantly.

For example in case an ACK is received by the mobile terminal instead of a NACK originally transmitted by the base station, the mobile station transmits a frame with data for error recovery although the original frame has been received correctly by the base station. This results in a waste of channel capacity, increases the transmission delay and reduces the overall capacity within the current base station cell. Otherwise, in case a NACK is received by the mobile terminal instead of an ACK originally transmitted by the base station, the mobile station is not instructed to send a frame with data for error recovery. This means the base station is not able to recover the erroneous data. The corrupt frame can only be modified by retransmission initiated via the radio link control (RLC) layer, which results in a significant delay in time of for instance about 0.5-1 s. This results in a significant waste of channel capacity, increases the transmission delay and reduces the overall capacity within the current base station cell.

In general, in order to avoid decrease of ARQ performance due to erroneous acknowledgment and/or non-acknowledgment signaling messages, the error rate of false positive events (ACK to NACK) and false negative events in the ACK/NACK signaling has to be limited to defined thresholds. For instance, the error rate of ACK to NACK should be at least approx. 1% or below, and the error rate of NACK to ACK should be at least approx. 0.01% or below.

The object of the present invention is to provide an improved acknowledgment and/or non-acknowledgment signaling for automatic request response mechanism, which prevents disadvantageous error rates of the acknowledgment and/or non-acknowledgment signaling.

The object of the invention is solved by the subject matter defined in the appended independent claims.

According to a first aspect of the present invention, a method for enhanced acknowledgment/non-acknowledgment signaling applicable to automatic repeat request mechanisms for mobile or wireless networks is provided. The automatic repeat request (ARQ) mechanisms is operable with a sender of data packets. The signaling comprises a number of ACK/NACK messages, which are dedicated to be transmitted on a time-multiplexed channel, which is partitioned into transport time intervals (TTIs) in accordance with the time-multiplexing. Within each transport time interval (TTI), $j_{max}$ shares are defined. Each share has a predefined extent in time. Each ACK/NACK message is transmitted within a predefined selection of shares. The total extent in time of the predefined selection of shares corresponds to an extent in time of the transport time interval.

According to an embodiment of the present invention, each ACK/NACK message is transmitted within each share defined within one transport time interval.

According to another embodiment of the present invention, the number of $j_{max}$ shares corresponds to a number of n ACK/NACK messages, which are to be transmitted within one transport time interval (TTI).

According to yet another embodiment of the present invention, the number of $j_{max}$ shares corresponds to a multiplicity of the number of n ACK/NACK messages, which are to be transmitted within one transport time interval (TTI). For transmission, the number of n ACK/NACK messages are distributed upon the number of $j_{max}$ shares within the transmission time interval and the ACK/NACK messages are transmitted accordingly.

According to a further embodiment of the present invention, the number of $j_{max}$ shares corresponds to an even multiplicity of the number of n ACK/NACK messages. For transmission, the number of n ACK/NACK messages are distributed evenly upon the number of $j_{max}$ shares within the transmission time interval and the ACK/NACK messages are transmitted accordingly.

According to yet a further embodiment of the present invention, the number of n ACK/NACK messages are distributed upon the number of $j_{max}$ shares in accordance with a round-robin method.

According to an additional embodiment of the present invention, each of the ACK/NACK messages indicates to the sender whether receiver of the data packets was able to decode successfully a data packet previously transmitted thereto or not.

According to yet an additional embodiment of the present invention, an interleave length for the transmission of a particular ACK/NACK message results from the total extent in time of an interval starting with a first transmission time interval including the particular ACK/NACK message within at least one share and ending with a second transmission time interval including the particular ACK/NACK message within at least one share.

According to an embodiment of the present invention, the predefined extents in time of the shares correspond to each other.

According to an embodiment of the present invention, the sender is a mobile terminal.

According to an embodiment of the present invention, the method for enhanced acknowledgment/non-acknowledgment signaling is applicable to enhanced uplink data access operable with the universal mobile telecommunication system. The universal mobile telecommunication system operates in the frequency division duplex domain. In more detail, the method for enhanced acknowledgment/non-acknowledgment signaling is applicable for hybrid ARQ mechanisms, which may be performed in accordance with redundancy versions.

According to a second aspect of the present invention, a method for enhanced acknowledgment/non-acknowledgment signaling is provided. The signaling is applicable to automatic repeat request mechanisms, which are operable with a sender of data packets. The signaling comprises a number of ACK/NACK messages, which are dedicated to be transmitted on a time-multiplexed channel, which is partitioned into transport time intervals (TTIs). Within at least one transport time interval (TTI), which is partitioned into a predefined number of $j_{max}$ shares, are received at least two ACK/NACK messages. The ACK/NACK messages, which have been received in the predefined number of $j_{max}$ shares are combined to obtain, reconstruct or recover the at least two ACK/NACK messages.

According to a third aspect of the present invention, computer program product for enhanced acknowledgment/non-acknowledgment signaling is provided. The computer program product comprises program code sections for carrying out the method according to an aforementioned embodiment of the invention, when the program is run on a controller, processor-based device, a computer, a terminal, a network device, a mobile terminal, or a mobile communication enabled terminal. Alternatively, an application specific integrated circuit (ASIC) may implement one or more instructions that are adapted to realize the aforementioned steps of the method of an aforementioned embodiment of the invention, i.e. equivalent with the aforementioned computer program product.

According to a fourth aspect of the invention, a computer program product is provided, which comprises program code sections stored on a machine-readable medium for carrying out the steps of the method according to an aforementioned embodiment of the invention, when the computer program product is run on a controller, processor-based device, a computer, a terminal, a network device, a mobile terminal, or a mobile communication enabled terminal.

According to a fifth aspect of the invention, a software tool is provided. The software tool comprises program portions for carrying out the operations of the aforementioned methods when the software tool is implemented in a computer program and/or executed.

According to a sixth aspect of the invention, a computer data signal embodied in a carrier wave and representing instructions is provided which when executed by a processor cause the steps of the method according to an aforementioned embodiment of the invention to be carried out.

According to a seventh aspect of the present invention, a device for enhanced acknowledgment/non-acknowledgment signaling is provided. The signaling is applicable to automatic repeat request mechanisms operable with a sender of data packets. The signaling comprises a number of ACK/NACK messages, which are dedicated to be transmitted on a time-multiplexed channel, which is partitioned into transport time intervals (TTIs). A number of $j_{max}$ shares is defined within each transport time interval (TTI) and each share has a predefined extent in time. A transmitter is adapted to transmit each ACK/NACK message within a predefined selection of shares. A total extent in time of the predefined selection of shares corresponds to an extent in time of the transport time interval (TTI).

According to an eight aspect of the present invention, a device for enhanced acknowledgment/non-acknowledgment signaling is provided. The signaling is applicable to automatic repeat request mechanisms, which are operable with a sender of data packets. The signaling comprises a number of ACK/NACK messages, which are dedicated to be transmitted on a time-multiplexed channel, which is partitioned into transport time intervals (TTIs). A receiver is adapted to receive within at least one transport time interval (TTI), which is partitioned into a predefined number of $j_{max}$ shares at least two ACK/NACK messages. A message handler is adapted to combine the ACK/NACK messages, which have been received in the number of $j_{max}$ shares, in order to obtain the at least two ACK/NACK messages.

The present invention will be understood and appreciated more fully from the following detailed description, taken in conjunction with the drawings in which.

Figure 1A:
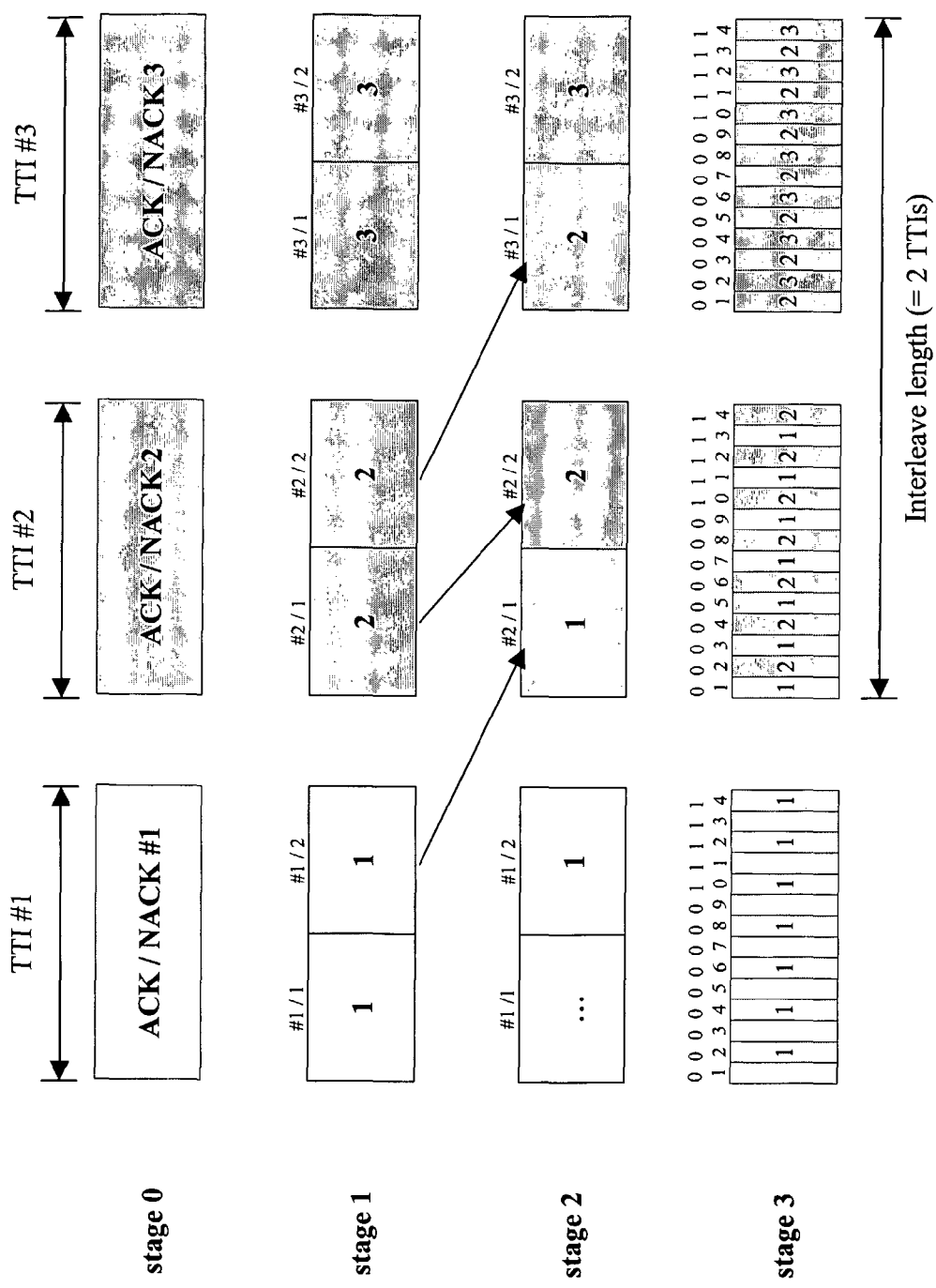
FIG. 1a illustrates different stages of an enhanced ACK/NACK signaling at a repetition time of 2 to realize a 2-bit enhanced ACK/NACK signaling according to an embodiment of the present invention.

Generally, base station (NodeB) and/or radio network controller (RNC) controlled ARQ mechanisms allow for rapid retransmissions of erroneously received data, thus reducing the number of radio link control (RLC) retransmissions and the associated delays, which are disadvantageously long. The ARQ mechanisms can improve the quality of service (QoS) experienced by the user of the mobile terminal (UE). As a base station controlled retransmission is less costly from the view of a delay in time, the physical channel(s), i.e. the physical uplink channel(s), is/are operable with higher error probability than in as defined in 3GPP Release 5 standard, which consequently may result in improved system capacity. The retransmission probability for the initial transmission is preferably in the order of 10-20%, when evaluating the employed ARQ mechanism as closed loop power control is used for the uplink, maintaining a given quality level in accordance with predefined quality of service (QoS) requirements. Significantly higher retransmission probabilities may lead to considerably reduced throughput experienced by the user of the mobile terminal (UE), while at very small retransmission probabilities the base station (NodeB) controlled ARQ mechanisms will not provide any additional gains compared to known 3GPP standards such as 3GPP Release 99, 4 and 5 standard.

Conversational services with strict delay requirements such as voice transmission may not be applicable to retransmissions as performed by ARQ mechanisms. ARQ mechanisms are thus mainly applicable to interactive and background services and, to some extent, to streaming services. Thus, the major targets from a performance point of view with ARQ mechanism to consider in the evaluation of uplink hybrid ARQ are reduced delay and increased individual mobile terminal (user) and system data throughput.

In principle, the suitable design of an ARQ scheme or hybrid ARQ scheme for uplink data transmission and in particular enhanced uplink data transmission, i.e. uplink data transmission with enhanced data rat(s), should have to take several individual aspects into account, comprising memory requirements in both the mobile terminal (UE) and the base station (NodeB), overhead in terms of power and number of bits required for the operation, in-sequence delivery, multiplexing of multiple transport channels, mobile terminal (UE) power limitations and complexity. Details about these aspects are without the scope of the present invention and require individual adaptation to the utilized system environment.

ARQ mechanisms are based on different protocol structures resulting in different ARQ processes, comprising for instance Stop-and-Wait (SAW), Concurrent Logical Channels (CLC), Go-back-N, and Selective-Repeat, typically employed in today's wireless communication technology.

With reference to the Stop-and-Wait (SAW) process, the sender sends a single frame and waits for the acknowledgment/non-acknowledgment signaling message. If the receiver receives the data within the frame properly, it responses with an acknowledgment signaling message (ACK). Otherwise the receiver issues a non-acknowledgment signaling message (NACK), which corresponds to a negative ACK. When the sender receives the ACK, new data in a new frame will be transmitted. If the sender receives a NACK or there is a timeout before retransmission, then the originally transmitted data or correcting data will be retransmitted. The Stop-and-Wait (SAW) process is of minor efficiency.

The Concurrent Logical Channels (CLC) forms a variation of the aforementioned Stop-and-Wait (SAW) process, in which one channel is logically divided into multiple virtual channels each performing the Stop-and-Wait (SAW) process. When a data packet is to be sent, it is put into one of the free virtual channels. The selection of which virtual channel to use can be done in a round robin fashion, and a virtual channel is assumed to be busy till an ACK is received. When a timeout occurs, the respective logical channel will re-send the data packet unacknowledged.

With reference to Go-back-N process, the sender sends a window of data segments. If a data segment is received incorrectly, the receiver sends a NACK and the sender will retransmit the concerned segment or retransmit correcting data and all the succeeding segments, even if some of them were received correctly at the receiver.

The Selective-Repeat process is similar to the aforementioned Go-back-N process except that only the data segments corresponding to a NACK or a timeout will be retransmitted correspondingly. For example if segments #1, #3, and #4 are received properly but #2 was responded with a NACK or a timeout has been occurred, the receiver will keep #3 and #4 in its buffer and when it gets the retransmission of #2, it will sends a cumulative ACK corresponding to segment #4. This avoids the retransmission of segments #3 and #4, which would have happened if Go-back-N were used.

In UMTS, a selective-repeat ARQ process is used in the radio link control (RLC) layer. In HS-DPA, a CLC ARQ scheme is used, in conjunction with the radio link control (RLC) retransmission mechanisms with a predefined number of virtual channels.

The use of ARQ mechanisms and processes affect multiple layers, i.e. the coding and soft combining/decoding is handled by the physical layer, while the retransmission protocol is handled by a MAC entity located in the base station (NodeB) and a corresponding entity located in the mobile terminal (UE). Typically the ACK/NACK signaling and retransmissions are done per uplink transmission time interval (TTI) basis in FDD (frequency division duplex) domain.

As aforementioned, associated control signaling required for the operation an ARQ scheme consists of downlink and uplink signaling. Downlink signaling consists typically of a single 1-bit acknowledgment/non-acknowledgment (ACK/NACK) information per (uplink) transmission time interval (TTI) in frequency division duplex (FDD) domain from the base station (NodeB) to the mobile terminal (UE). A well-defined processing time from the reception of a transport block such as transport frame at the base station (NodeB) to the transmission of the acknowledgment/non-acknowledgment signaling message (ACK/NACK) in the downlink is usually used in order to avoid explicit signaling of the ARQ process number along with the acknowledgment/non-acknowledgment signaling (ACK/NACK). The information needed by mobile terminal (UE) necessary to operate the ARQ scheme/mechanism is either explicitly signaled by the base station (NodeB), or decided by the mobile terminal (UE) itself, depending on the mechanism/scheme employed.

The operation of an enhanced uplink packet access (EUPA) in the frequency division duplex (FDD) domain via the dedicated channel (DCH) requires some adapted signaling in downlink direction. There are some basic requirements for the physical channel structure for Layer 1 (L1) signaling in downlink, which in particular should be independent from downlink operation, in particular HS-DSCH operation. The basic requirements further comprises a low delays a reliable signaling reliability and low overhead and acceptable signaling peak power and average power requirements in the downlink direction.

Uplink signaling relates to necessary information needed by the base station (NodeB) to operate an ARQ scheme, which uplink signaling may be grouped into outband signaling and inband signaling. Depending on the scheme considered, parts of the information might either be explicitly signaled or implicitly deduced.

With further reference to the EUPA for the FDD domain currently under discussion in the TSG (technical specification group) RAN (radio access network) being part of the 3GPP, reducing the minimum transmission TTI supported from the 10 ms in 3GPP Release 5 standard to a lower value may reduce the transfer delay through a reduced Uu transfer delay and reduced delays due to TTI alignment, i.e. incoming data to be transmitted has to wait until the start of the next TTI. A reduced TTI may also allow for reduced processing time as the payload sizes are reduced compared to a larger TTI, a shortened roundtrip time in base station (NodeB) controlled ARQ protocols and reduced latencies in some scheduling schemes. Reduced delays may also result in a higher system throughput and better resource utilization. The major targets from a performance point of view with a reduced uplink TTI are improved end-user quality, increased user and system throughput, and significant delay reduction. It is preferable if the 3GPP Release 5 standard minimum TTI of 10 ms is a multiple of the reduced TTI considered. A possible choice is a 2 ms TTI, which also is an alignment to the short TTI adopted for HS-DSCH. Nevertheless the influence of a short TTI on link performance need to be considered.

When assuming L1 ARQ scheme working with reduced TTI, especially 2 ms TTI, the downlink ACK/NACK signaling is forced to be transmitted in the downlink within the 2 ms TTI. In some cases, the downlink ACK/NACK signaling is even forced to be transmitted in one time slot corresponding to for instance 0.66 ms. (depending on the number of ARQ processes simultaneously performed) At low velocity of the mobile terminal, the link level performance of downlink ACK/NACK signaling for 2 ms TTI will not decrease significantly, since the closed loop power control can conquer fast fading effects successfully. But at high velocity of the mobile terminal, the closed loop power control can not follow the fast fading effects and the ACK/NACK signaling performance operating within 2 ms TTI will decrease significantly, since the resulting short interleave length (time) will not give enough interleaving gain.

The principle inventive concept relates to an increase of an interleave length for the ACK/NACK signaling, which is in particular applicable to ACK/NACK signaling transmitted in 2 ms TTI. The inventive concept allows to increase the interleave length without requiring additional radio frequency resource in the downlink direction. In detail, the basic approach of the present invention refers to a multiple use of one time transmission interval (TTI), which is conventionally employed to an individual ACK/NACK signaling. The single TTI is partitioned into several multi TTIs, each being applicable to an ACK/NACK signaling. The partitioning may be performed in accordance with the number of time slots available in the TTI. This means, the the downlink resource (such as downlink power and chips) used for downlink transmission of the ACK/NACK signaling in one TTI are shared in multi TTIs.

Figure 1B:
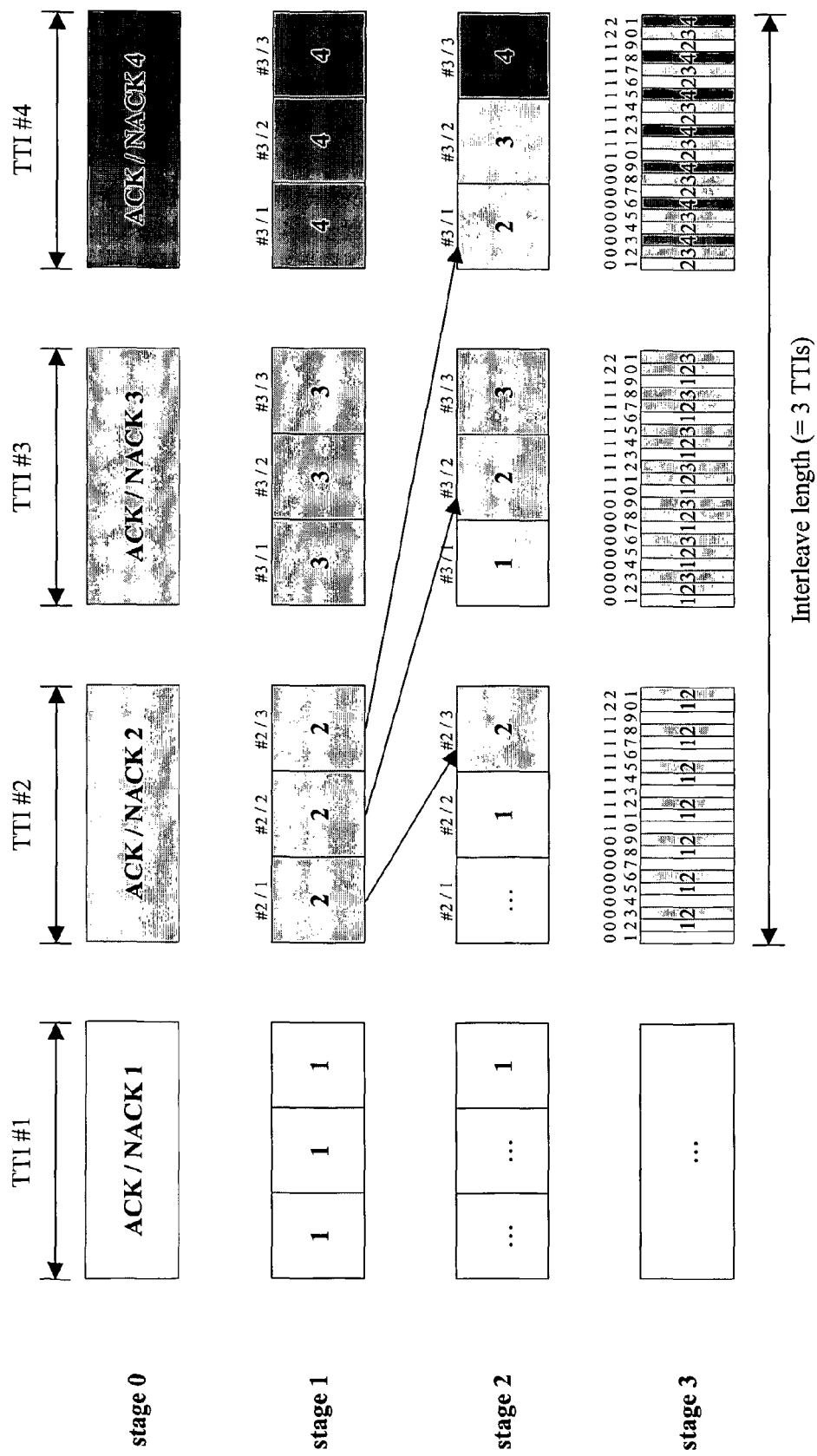
FIG. 1b illustrates different stages of an enhanced ACK/NACK signaling at a repetition time of 3 to realize a 3-bit enhanced ACK/NACK signaling according to an embodiment of the present invention.

The principles of the present invention described above will be more apparent with reference to FIGS. 1a and 1b, which illustrate embodiment of the present invention with 2 bit and 3-bit enhanced ACK/NACK signaling, respectively.

With reference to FIG. 1a, an example ACK/NACK signaling is depicted which enables a 2-bit enhanced ACK/NACK signaling at an interleave length of 2 TTIs. The enhanced ACK/NACK signaling additionally comprises different stages.

Stage 0 illustrates the conventional ACK/NACK signaling. For the way of illustration, ACK/NACK signaling messages 1 to 3 associated with TTIs #1 to #3 is schematically depicted, each assumed to be transmitted in the corresponding TTI #i, which may have for example 10 ms or preferably 2 ms but also any other duration in time. It may be assumed that the illustrated ACK/NACK signaling messages 1 to 3 are successive in time.

In stage 1 or first stage, the TTIs #1 to #3 of each ACK/NACK signaling message 1 to 3 is partition or divided into two individual shares. The denotation of the shares refers to the numbering of the corresponding TTI and includes a share number beginning with 1 for the first share in the TTI. This means TTI #1 is divided into shares #1/1 and #1/2 and TTI #i (i∈N) is divided into shares #i/1 and #i/2, respectively. The shares may have the same duration in time and may comprise one or an even multiple of time slots, but it should be noted that the shares obtained by partitioning are not limited thereto. Each share is applicable to allow transmission of an ACK/NACK signaling message. This means for instance that the signaling information of the ACK/NACK signaling message 2 is transmitted twice within the TTI #2 comprising the two shares #2/1 and #2/2 (the contents of the ACK/NACK signaling message 2 is doubled), which enhances at the receiver side, i.e. at side of the mobile terminal, the recognition of erroneous ACK/NACK signaling transmission. In case the signaling information transmitted within the two shares #2/1 and #2/2 of the TTI #2 differs, an erroneous transmission thereof is to be assumed and countermeasures can be taken. The interleave length in stage 1 is not extended and is one TTI, which corresponds to the original interleave length of the conventional ACK/NACK signaling.

With reference to stage 2 or second stage, the interleave length is extended to two TTIs, when assuming that the ACK/NACK signaling messages #1 to #3 are immediately successive in time. As depicted, the signaling information of the ACK/NACK signaling message 1 is shared upon share #1/2 of the TTI #1 and share #2/1 of the TTI #2. Correspondingly, the signaling information of the ACK/NACK signaling message 2 is shared upon share #2/2 of the TTI #2 and share #3/1 of the TTI #3. This means, that in case a transmission within one TTI #i is lost due to fading effects, misadjusted transmission power etc. or is detected as being erroneous, the required signaling information can be obtained from the transmission of the TTI #i and the TTI #i+1 succeeding in time, respectively. The extended interleave length is advantageous in transmission power control perspective. The longer the interleave length the higher the possibility to receive a transmission with well-adjusted transmission power.

With reference to stage 3 or third stage, the total interleave length is still extended to two TTIs but the signaling information of the shares is additionally interleaved within the divided TTIs. Each TTI is partitioned or divided into multiplicity of shares 1 to $j_{max}$; herein into fourteen shares $j_{max}$=14) for the way of illustration. The shares 1 to $j_{max}$ of each TTI #i includes signaling information of two the ACK/NACK signaling messages #i−1 and #i. This means, the TTI #2 is divided into the shares #2/1 to #2/14, each of which including either signaling information of the ACK/NACK signaling messages #1 (shares #2/1+2*j, j∈N⁰, j≦6) or signaling information of the ACK/NACK signaling messages #2 (shares #2/2+2*j). Further, the TTI #3 is divided into the shares #3/1 to #3/14, each of which including either signaling information of the ACK/NACK signaling messages #2 (shares #3/1+2*j) or signaling information of the ACK/NACK signaling messages #3 (shares #3/2+2*j). The shares are associated with the signaling information of the ACK/NACK signaling messages #i in accordance with the round-robin method. The association of shares to signaling information of different ACK/NACK signaling messages is exemplary; any other distribution among the shares may be applicable thereto.

The aforementioned distribution or interleaving of signaling information of different ACK/NACK signaling messages upon a multiplicity of shares formed from one individual TTI represents a redundancy, which enhances the ARQ performance. In order to provide for the same information redundancy of the signaling information relating the ACK/NACK signaling messages #i−1 and #i, respectively, within the shared TTI #i, the number of shares should be dividable by the number of different ACK/NACK signaling messages #i−1 and #i contributing their signaling information for being included. Hence, the number of shares should be dividable by two, herein. Nevertheless, an equal distribution of the redundancy of the signaling information is not necessary.

Informational contents of the ACK/NACK signaling messages #i can be designated as a 1-bit information ACK/NACK signaling. The 1-bit informational contents of the conventional ACK/NACK signaling messages #i is illustrated correspondingly in stage 0. With reference to stages 1 to 3, the informational contents of the ACK/NACK signaling messages #i is extended to a 2-bit information ACK/NACK signaling. Detailed reference should be given to third stage. Although each share contains a 1-bit informational contents, which addition might result in a $j_{max}$-bit informational contents, the purposed arrangement being formed of the 1-bit information contents of a first 1-bit information ACK/NACK signaling and second 1-bit information ACK/NACK signaling effectively results in a total 2-bit informational contents.

It should be noted that the receiver, herein the mobile terminal (UE), needs to receive two successive TTIs under well-formed transmission conditions to obtain the one ACK/NACK signaling message and the signaling information thereof, respectively, corresponding to the total interleave length of two TTIs.

With reference to FIG. 1b, an example ACK/NACK signaling is depicted which enables a 3-bit enhanced ACK/NACK signaling at an interleave length of 3 TTIs. The enhanced ACK/NACK signaling additionally comprises different stages, which correspond to the stages described in detail with reference to FIG. 1a. The analogy between the two embodiments of the present invention illustrated in FIGS. 1a and 1b will be appreciated by those skilled in the art, when reading the description below.

Stage 0 illustrates again the conventional ACK/NACK signaling. For the way of illustration, ACK/NACK signaling messages 1 to 4 associated with TTIs #1 to #4 are schematically depicted, each assumed to be transmitted in the corresponding TTI #i. It may be assumed that the illustrated ACK/NACK signaling messages 1 to 4 are successive in time.

In stage 1 or first stage, the TTIs #1 to #4 of each ACK/NACK signaling message 1 to 4 is partition or divided into three individual shares with a denotation analogous to that described with reference to FIG. 1a. This means TTI #i (i∈N) is divided into shares #i/1 to #i/3. Each share is applicable to allow transmission of an ACK/NACK signaling message. The signaling information of the ACK/NACK signaling message i is transmitted three times within the TTI #i comprising the two shares #i/1 to #i/3 (the contents of the ACK/NACK signaling message i is tripled). The interleave length in stage 1 is not extended and is one TTI, which corresponds to the original interleave length of the conventional ACK/NACK signaling.

With reference to stage 2 or second stage, the interleave length is extended to three TTIs, when assuming that the ACK/NACK signaling messages #1 to #4 are immediately successive in time. As depicted, the signaling information of the ACK/NACK signaling message 1 is shared upon share #1/3 of the TTI #1, share #2/2 of the TTI #2 and share #3/3 of TTI #3. Correspondingly, the signaling information of the ACK/NACK signaling message 2 is shared upon share #2/3 of the TTI #2, share #3/2 of the TTI #3 and share #4/1 of share TTI #4. The signaling information of the ACK/NACK signaling message i is distributed or interleaved upon TTI #i, TTI #i+1 and TTI #i+2, the latter two succeeding in time. The extended interleave length is again advantageous in transmission power control perspective. The longer the interleave length the higher the possibility to receive a transmission with well-adjusted transmission power.

With reference to stage 3 or third stage, the total interleave length is still extended to two TTIs but the signaling information of the shares is additionally interleaved within the divided TTIs. Each TTI is partitioned or divided into multiplicity of shares 1 to $j_{max}$; herein into twenty-one shares ($j_{max}$=21) for the way of illustration. The shares 1 to $j_{max}$ of each TTI #i includes signaling information of two the ACK/NACK signaling messages #i−2, #i−1 and #i. This means, the TTI #3 is divided into the shares #3/1 to #3/21, each of which including signaling information of the ACK/NACK signaling messages #1 (shares #2/1+3*j, j∈N⁰, j≦6=$j_{max}$/#TTIs−1), signaling information of the ACK/NACK signaling messages #2 (shares #2/2+3*j) and signaling information of the ACK/NACK signaling messages #3 (shares #3/3+3*j), respectively. Further, the TTI #4 is divided into the shares #4/1 to #4/14, each of which including signaling information of the ACK/NACK signaling messages #2 (shares #4/1+3*j), signaling information of the ACK/NACK signaling messages #3 (shares #4/2+3*j) or signaling information of the ACK/NACK signaling messages #4 (shares #3/3+3*j). The shares are interleaved in accordance with the round-robin method, which should be understood as not limiting thereto.

The aforementioned distribution or interleaving of signaling information of different ACK/NACK signaling messages upon a multiplicity of shares being formed from a TTI represents a redundancy, which enhances the ARQ performance. In order to provide for the same information redundancy of the signaling information relating the ACK/NACK signaling messages #i−2, #i−1, and #i, respectively, within the shared TTI #i, the number of shares should be dividable by the number of different ACK/NACK signaling messages herein #i−2, #i−1, and #i contributing their signaling information for being included and interleaved.

With reference to stages 1 to 3, the informational contents of the ACK/NACK signaling messages #i is extended to a 3-bit information ACK/NACK signaling. Detailed reference should be given to third stage. Although each share contains a 1-bit informational contents, which addition might result in a $j_{max}$-bit informational contents, the purposed arrangement being formed of the 1-bit information contents of a first 1-bit information ACK/NACK signaling, a second 1-bit information ACK/NACK signaling and a third 1-bit information ACK/NACK signaling effectively results in a total 3-bit informational contents.

It should be noted that the receiver, herein the mobile terminal (UE), needs to receive two successive TTIs under well-formed transmission conditions to obtain the one ACK/NACK signaling message and the signaling information thereof, respectively, corresponding to the total interleave length of three TTIs.

The aforementioned embodiments form only particular embodiments. For instance in the case that the 1-bit ACK/NACK signaling information shall repeated totally 6 times, then the ACK/NACK signaling information might be included in two shares of a TTI and transmitted in three individual TTIs.

In the following, physical layer ARQ mechanisms is described in more detail. It should be assumed that a continuous data transmission is operable over multiple transport channels multiplexed in time and each comprising a transport block, containing a predetermined part of the data. To enable physical layer ARQ mechanism, the receiver of the transport blocks has to signalized with each received transport block to the sender thereof whether the decoding of the data from the transport block was successful or not. The signalizing is operated by transmitting an acknowledgment/non-acknowledgment signalizing message relating a particular transport block. In accordance with the aforementioned ARQ protocol schemes, the signalizing has to be done at a predefined time interval.

Figure 2A:
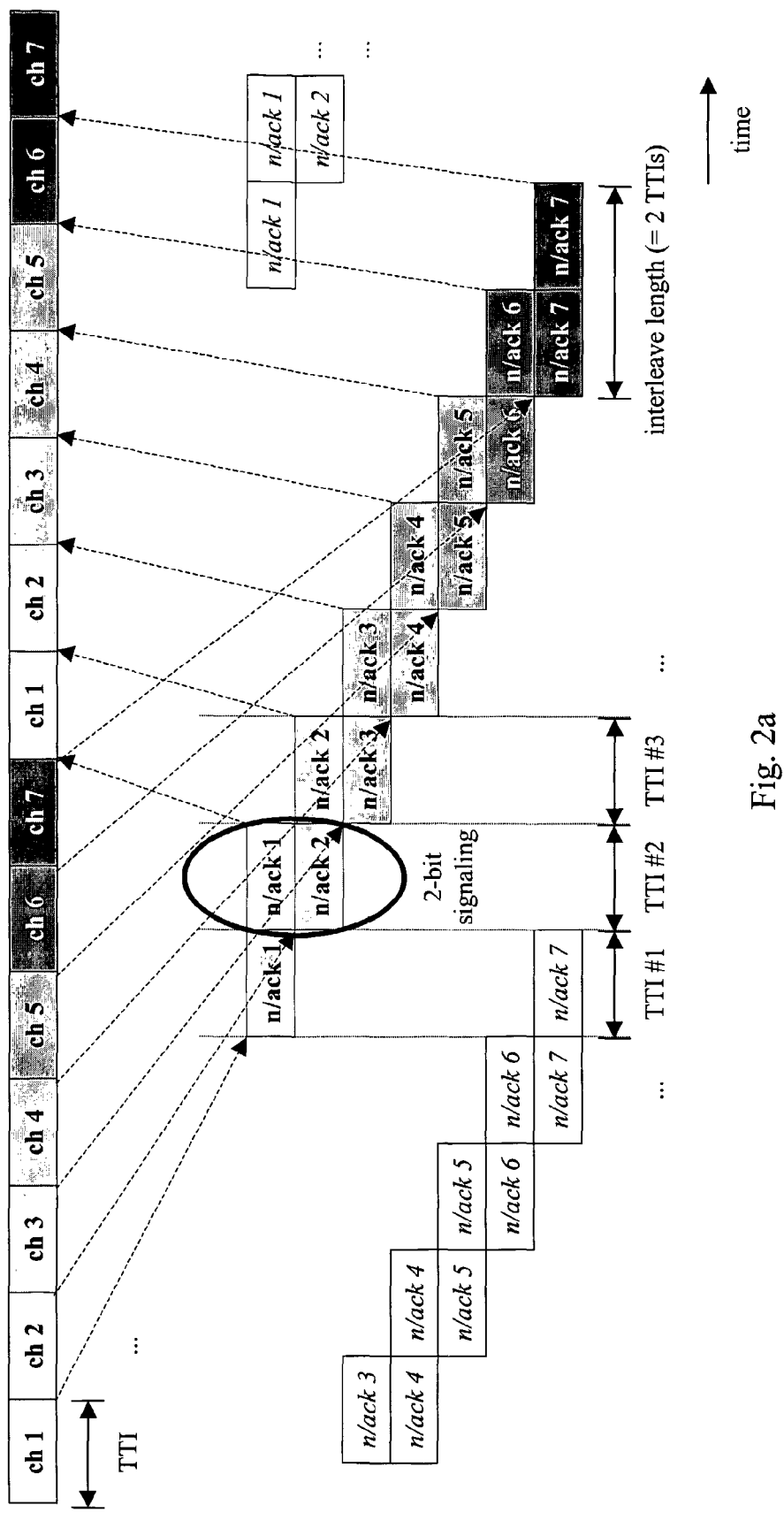
FIG. 2a illustrates a 2-bit enhanced ACK/NACK signaling scheme according to an embodiment of the present invention.
Figure 2B:
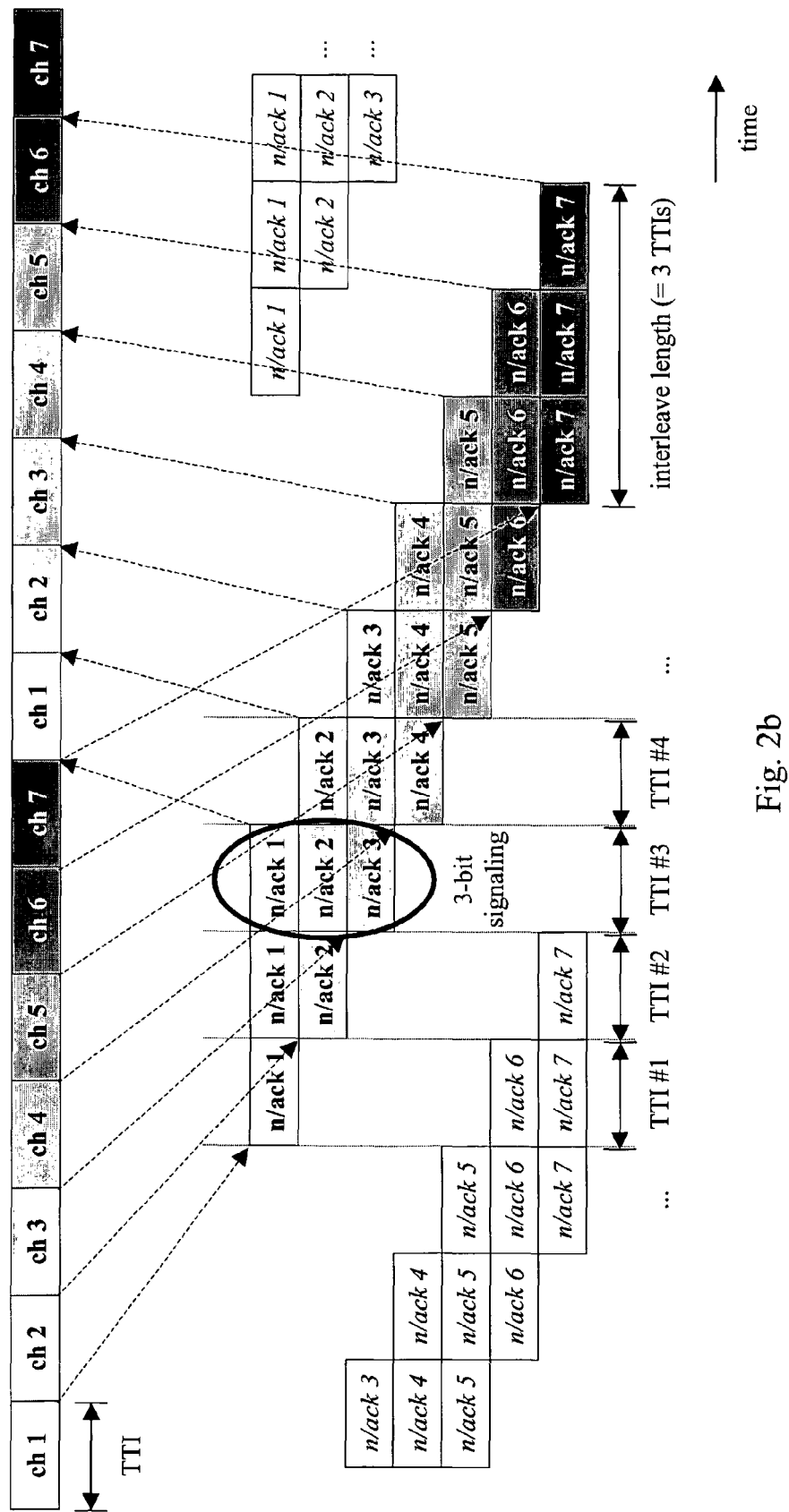
FIG. 2b illustrates a 3-bit enhanced ACK/NACK signaling scheme according to an embodiment of the present invention.
Figure 3:
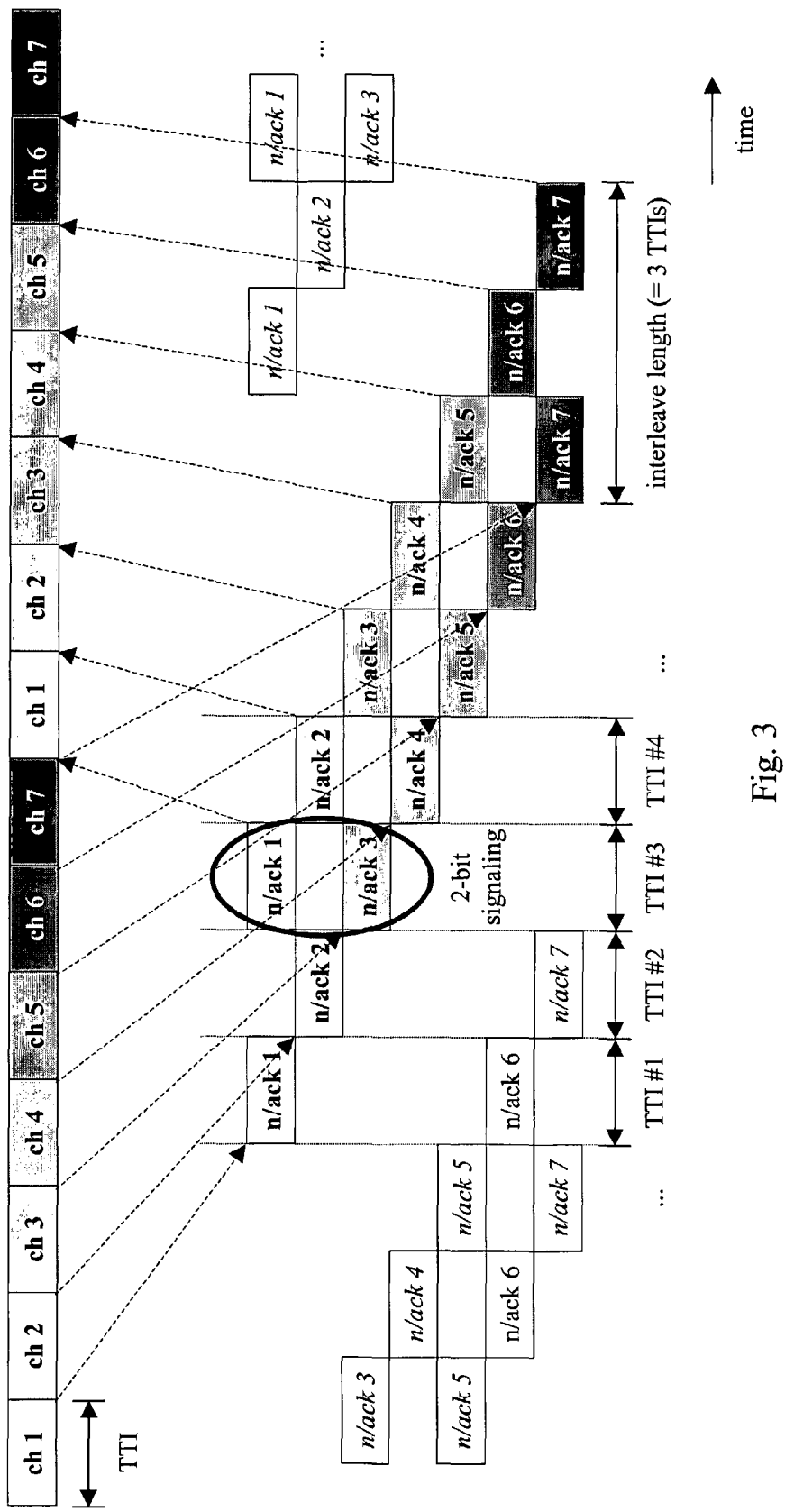
FIG. 3 illustrates a 2-bit enhanced ACK/NACK signaling scheme with discrete signaling according to an embodiment of the present invention.

With reference to FIGS. 2a, 2b and 3 but without limiting thereto, seven transport channels designated as ch 1 to 7 shall be employed for data transmission. As illustrated in FIGS. 2a, 2b and 3, each transport block transmitted in a ch I (I=1, . . . , 7) is responded with at least one corresponding acknowledgment/non-acknowledgment signaling message, denoted herein as n/ack I (I=1, . . . , 7) to indicate the aforementioned association between transport block transmitted in transport channel and corresponding acknowledgment/non-acknowledgment signalizing message informing about the success of the decoding of the data contained in the transport block. Each transport channel is handled by an independent ARQ process, i.e. independent from the ARQ processes of the other transport channels. Consequently, the skilled reader will appreciate that the acknowledgment/non-acknowledgment signaling relating to a particular transport channel, which has been used for transmitting a transport block, has to be received previous to the next use of the particular transport channel. A corresponding behavior is schematically illustrated in the FIGS. 2a, 2b and 3 with the help of arrows connecting schematic channel illustrations and schematic ACK/NACK signaling massage illustrations. It should be noted that merely relative course in time might be obtained from the illustrated transport channel and massage sequence illustration at the very most.

The vertically stacked schematic ACK/NACK signaling message illustrations depicted in FIGS. 2a, 2b and 3 may be appreciated as representing the shares into which a TTI #i is partitioned or divided, respectively, described above in detail. It should be noted that the sequence diagrams, shown in FIGS. 2a, 2b and 3 illustrate time sequence of transmission time intervals of two channels, the physical channel comprising time-multiplexed transport channels for transport data blocks and the back channel for signaling information in accordance with the ARQ processes operated in association with several transport channels. That means, the inventive concept for enhanced ACK/NACK signaling does not require additional radio frequency resources such as additional bandwidth due to the operation of two or more distinct channels for back-transmission for the ACK/NACK signaling information.

FIG. 2a illustrates a 2-bit enhanced ACK/NACK signaling scheme according to an embodiment of the present invention, which corresponds to the description referring to FIG. 1a. Accordingly, the aforementioned TTI numbering has been included in the sequence diagram. In detail, the illustrated 2-bit enhanced ACK/NACK signaling at TTI #2 may correspond to second and third stage described above. The fine granularity of the interleaving within one TTI in accordance with third stage mechanism shall be assumed as omitted in FIG. 2a.

FIG. 2b illustrates a 3-bit enhanced ACK/NACK signaling scheme according to an embodiment of the present invention, which corresponds to the description referring to FIG. 1b. Accordingly, the aforementioned TTI numbering has been included in the sequence diagram. In detail, the illustrated 3-bit enhanced ACK/NACK signaling at TTI #3 may correspond to second and third stage described above. The fine granularity of the interleaving within one TTI in accordance with third stage mechanism shall be assumed as omitted in FIG. 2b.

FIG. 3 illustrates a modification of a 2-bit enhanced ACK/NACK signaling scheme within the scope of the present invention. Whereas the embodiments described above combine ACK/NACK signaling of successive transport channels, it should be understood that the combination is not limited to such a combination. The combination of ACK/NACK signaling relating to transport channels is combinable in any way, just limited by the restriction that the ACK/NACK signaling associated with a transport channel has to be completed in time before this transport channel is scheduled in time for a next transmission. This is because the next transmission may comprise either a transport block with new data (in response to an ACK) or a transport block containing data in accordance with the employed ARQ mechanism (in response to a NACK). In the latter case transport block may contain the original data which has been transmitted previously over this transport channel or data allowing to correct the original data, which has been received erroneous or corrupted.

FIG. 3 illustrates a 2-bit enhanced ACK/NACK signaling scheme with an interleave length of three TTIs. The 2-bit enhanced ACK/NACK signaling means that each TTI #i is partitioned/divided into at least two shares and to transmit the signaling information of two ACK/NACK signaling messages and signaling information associated with two transport channels or two ARQ processes assigned to the two transport channels, respectively. The extended interleave length exceeding two TTIs is obtained by transmit the signaling information associated with two transport channels, which are not immediately successive to each other in time. Herein, the signaling information associated with a first transport channels and the signaling information associated with a second transport channels, which succession in time of both transport channels is spaced at one TTI. Consequently, the interleave length results in three TTIs. Correspondingly, by extending the spacing between the transport channels even more extended interleave lengths can be obtained. The embodiment depicted in FIG. 3 illustrates a measure to reduce the number of ACK/NACK signaling bits transmitted in one TTI while extending the interleave length to a defined level. In general, the signaling bits from one a 1-bit ACK/NACK signaling information can be transmitted in discrete TTIs. The receiver may employ soft combining method to recover the ACK/NACK signaling bits from the discrete TTIs.

An association of received ACK/NACK signaling information to respective ARQ processes of the transport channels is obtainable from the reception sequence of the ACK/NACK signaling information provided that the receiver, herein for instance the mobile terminal (UE), as described above knows about the forming of the ACK/NACK signaling messages. It should be noted that the ACK/NACK signaling information associated with a transport channel might not be limited to 1-bit informational contents. The designation of 1-bit informational contents relates to the ACK/NACK signaling purpose to indicate a successful decoding or an unsuccessful decoding of data received by the receiver at the transport channel. The ACK/NACK signaling information may also contain supplementary information such as an identifier for associating ACK/NACK signaling information with ARQ process or transport channel, scheduling information and the like.

Details about the coding of the multiplexed transport channels and rate matching, used to match the number of coded bits to the number of channel bits, is out of the scope of the present invention. In general, multiple multiplexed transport channels may be used to balance the quality requirements between the different transport channels. It should be noted that multiplexing of several transport channels implies that the number of bits may vary between retransmissions depending on the activity, i.e. the retransmission may not necessarily consist of the same set of coded bits as the original transmission.

Although the embodiments of the present invention have been described and illustrated in detail, it will be evident to those skilled in the art that various modifications and changes my be made without departing from the scope of the invention as set forth in the appended claims.

The invention claim is:

1. Method for enhanced acknowledgement/non-acknowledgement signaling applicable to automatic repeat request mechanisms operable with a sender of data packets in wireless networks, wherein said signaling comprises a number of ACK/NACK messages for being transmitted on a time-multiplexed channel being partitioned into transport time intervals (TTIs), said method comprising:

defining a number of $j_{max}$ shares within each transport time interval (TTI), wherein each share has a predefined extent in time; and transmitting each ACK/NACK message within a predefined selection of shares, wherein a total extent in time of said predefined selection of shares corresponds to an extent in time of said transport time interval (TTI).

2. Method according to claim 1, which comprises a first stage comprising:

transmitting each ACK/NACK message within each shares defined within one transport time interval (TTI).

3. Method according to claim 1, which comprises a second stage, wherein said number of $j_{max}$ shares corresponds to a number of n ACK/NACK messages, which are to be transmitted within one transport time interval (TTI).

4. Method according to claim 1, which comprises a third stage, wherein said number of $j_{max}$ shares corresponds to a multiplicity of said number of n ACK/NACK messages to be transmitted within one transport time interval (TTI), said method comprising:

transmitting said number of n ACK/NACK messages distributed upon said number of $j_{max}$ shares within said transmission time interval (TTI).

5. Method according to claim 4, wherein said number of $j_{max}$ shares corresponds to an even multiplicity of said number of n ACK/NACK messages, said method comprises:

transmitting said number of n ACK/NACK messages distributed evenly upon said number of $j_{max}$ shares within said transmission time interval (TTI).

6. Method according to claim 4, wherein said number of n ACK/NACK messages are distributed upon said number of $j_{max}$ shares in accordance with a round-robin method.

7. Method according to claim 1, wherein each of said ACK/NACK messages indicates to said sender whether a data packet previously transmitted has been decoded successfully or not by a receiver of said data packets.

8. Method according to claim 1, wherein an interleave length for the transmission of a particular ACK/NACK message results from the total extent in time of an interval starting with a first TTI including said particular ACK/NACK message within at least one share and ending with a second TTI including said particular ACK/NACK message within at least one share.

9. Method according to claim 1, wherein said predefined extents in time of said shares correspond to each other.

10. Method according to claim 1, wherein said sender is a mobile terminal.

11. Method according to claim 1, which is applicable to enhanced uplink data access operable with the universal mobile telecommunication system, wherein said universal mobile telecommunication system operates in the frequency division duplex domain.

12. Computer program product for enhanced acknowledgement/non-acknowledgement signaling, comprising program code sections stored on a machine-readable medium for carrying out the steps of claim 1, when said program product is run on a controller, processor-based device, a computer, a microprocessor based device, a terminal, a network device, a mobile terminal or a mobile communication enabled terminal.

13. Software tool for enhanced acknowledgement/non-acknowledgement signaling, comprising program portions for carrying out the operations of claim 1, when said program is stored in a machine-readable medium and configured to be executed on a controller, processor-based device, a microprocessor based device, processing device, a terminal device, a network device, a mobile terminal, or a mobile communication enabled terminal.

14. Method for enhanced acknowledgement/non-acknowledgement signaling applicable to automatic repeat request mechanisms operable with a sender of data packets, wherein said signaling comprises a number of ACK/NACK messages for being transmitted on a time- multiplexed channel being partitioned into transport time intervals (TTIs), said method comprising:

receiving within at least one transport time interval being partitioned into a predefined number of shares at least two ACK/NACK messages; and combining said ACK/NACK messages received in said predefined number of shares to obtain said at least two ACK/NACK messages.

15. Computer program product for enhanced acknowledgement/non-acknowledgement signaling, comprising program code sections stored on a machine-readable medium for carrying out the steps of claim 14, when said program product is run on a controller, processor-based device, a computer, a microprocessor based device, a terminal, a network device, a mobile terminal, or a mobile communication enabled terminal.

16. Software tool for enhanced acknowledgement/non-acknowledgement signaling, comprising program portions for carrying out the operations of claim 14, when said program is stored in a machine-readable medium and configured to be executed on a controller, processor-based device, a microprocessor based device, processing device, a terminal device, a network device, a mobile terminal, or a mobile communication enabled terminal.

17. Device for enhanced acknowledgement/non-acknowledgement signaling applicable to automatic repeat request mechanisms operable with a sender of data packets, wherein said signaling comprises a number of ACK/NACK messages for being transmitted on a time-multiplexed channel being partitioned into transport time intervals (TTIs), wherein a number of $j_{max}$ shares is defined within each transport time interval (TTI), wherein each share has a predefined extent in time, said device comprising:

a transmitter, which is adapted to transmit each ACK/NACK message within a predefined selection of shares, wherein a total extent in time of said predefined selection of shares corresponds to an extent in time of said transport time interval (TTI).

18. Device for enhanced acknowledgement/non-acknowledgement signaling applicable to automatic repeat request mechanisms operable with a sender of data packets, wherein said signaling comprises a number of ACK/NACK messages for being transmitted on a time-multiplexed channel being partitioned into transport time intervals (TTIs), said device comprising:

a receiver, which is adapted to receive within at least one transport time interval being partitioned into a predefined number of shares at least two ACK/NACK messages; and a message handler which is adapted to combine said ACK/NACK messages received in said predefined number of shares to obtain said at least two ACK/NACK messages.

\* \* \* \* \*